(12) United States Patent
Flaherty et al.

(10) Patent No.: US 8,922,965 B2
(45) Date of Patent: Dec. 30, 2014

(54) CONTROLLER CIRCUIT INCLUDING A SWITCH MODE POWER CONVERTER AND AUTOMATIC RECLOSER USING THE SAME

(75) Inventors: Richard Charles Flaherty, Fuquay Varina, NC (US); Roberto Gomez Rodriguez, Mexico City (MX)

(73) Assignee: Tyco Electronics Corporation, Berwyn, PA (US)

( * ) Notice: Subject to any disclaimer, the term of this patent is extended or adjusted under 35 U.S.C. 154(b) by 507 days.

(21) Appl. No.: 13/190,727

(22) Filed: Jul. 26, 2011

(65) Prior Publication Data
US 2012/0019971 A1 Jan. 26, 2012

Related U.S. Application Data

(60) Provisional application No. 61/367,584, filed on Jul. 26, 2010.

(51) Int. Cl.
| | | |
|---|---|---|
| H02H 3/06 | (2006.01) | |
| H01H 47/32 | (2006.01) | |
| H02H 3/04 | (2006.01) | |
| H02H 3/08 | (2006.01) | |
| H02H 3/093 | (2006.01) | |

(52) U.S. Cl.
CPC .............. *H02H 3/06* (2013.01); *H01H 47/325* (2013.01); *H02H 3/04* (2013.01); *H02H 3/08* (2013.01); *H02H 3/093* (2013.01)
USPC ......................................................... 361/93.4

(58) Field of Classification Search
USPC .............................. 361/71–73, 115, 93.1, 93.4
See application file for complete search history.

(56) References Cited

U.S. PATENT DOCUMENTS

| 3,700,933 A | 10/1972 | Harkenrider et al. |
| 4,300,090 A | 11/1981 | Weber |

(Continued)

FOREIGN PATENT DOCUMENTS

| DE | 10 2007 060 201 A1 | 6/2009 |
| EP | 0 027 843 A1 | 5/1981 |

(Continued)

OTHER PUBLICATIONS

International Search Report Corresponding to International Application No. PCT/US2011/045268; Date of Mailing: May 7, 2012; 12 Pages.

(Continued)

*Primary Examiner* — Rexford Barnie
*Assistant Examiner* — Christopher Clark
(74) *Attorney, Agent, or Firm* — Myers Bigel Sibley & Sajovec, P.A.

(57) ABSTRACT

An autorecloser circuit including a relay circuit with an electromagnetic relay configured to be coupled between an AC power source and a customer location to deliver current from the AC power source to the customer location. A controller coupled to the relay circuit is configured to control the electromagnetic. A current sense circuit coupled to the controller is configured to detect an amount of the current that is delivered to the customer location and a reference voltage circuit coupled to the controller is configured to establish a reference level for the amount of the current that is delivered to the customer location. A power circuit coupled to the controller and to the relay circuit is configured to provide a DC power source to the controller and to the relay circuit from the AC power source. The controller is configured to disconnect or reconnect the AC power source from the customer location based on the detected amount of current.

18 Claims, 5 Drawing Sheets

(56) References Cited

U.S. PATENT DOCUMENTS

| | | | |
|---|---|---|---|
| 4,994,934 A * | 2/1991 | Bouhenguel | 361/71 |
| 5,452,172 A * | 9/1995 | Lane et al. | 361/71 |
| 5,657,194 A * | 8/1997 | Waltz | 361/75 |
| 5,691,871 A * | 11/1997 | Innes | 361/96 |
| 5,701,080 A * | 12/1997 | Schumacher et al. | 324/539 |
| 5,936,817 A * | 8/1999 | Matsko et al. | 361/72 |
| 6,807,036 B2 * | 10/2004 | Baldwin | 361/42 |
| 6,829,123 B2 * | 12/2004 | Legatti et al. | 361/1 |
| 6,903,942 B2 | 6/2005 | Flaherty | |
| 7,063,270 B2 * | 6/2006 | Bowers et al. | 239/1 |
| 7,315,097 B2 * | 1/2008 | Tajika | 307/131 |
| 7,656,634 B2 * | 2/2010 | Robertson et al. | 361/93.7 |
| 7,675,721 B2 * | 3/2010 | Elms | 361/42 |
| 8,026,470 B2 * | 9/2011 | Flaherty | 250/214 R |
| 8,139,333 B2 * | 3/2012 | Imai et al. | 361/59 |
| 2004/0155638 A1 * | 8/2004 | Flaherty | 323/282 |
| 2009/0261660 A1 * | 10/2009 | Flaherty | 307/117 |
| 2010/0283328 A1 | 11/2010 | Eggert | |
| 2011/0241444 A1 * | 10/2011 | DuBose et al. | 307/126 |

FOREIGN PATENT DOCUMENTS

| | | |
|---|---|---|
| FR | 2 696 054 A1 | 3/1994 |
| WO | WO 2010/041085 A1 | 4/2010 |

OTHER PUBLICATIONS

International Preliminary Report on Patentability Corresponding to International Application No. PCT/US2011/045268; Date of Mailing: Feb. 7, 2013; 8 Pages.

* cited by examiner

CONTROLLER CIRCUIT INCLUDING A SWITCH MODE POWER CONVERTER AND AUTOMATIC RECLOSER USING THE SAME

RELATED APPLICATION(S)

The present application claims the benefit of U.S. Provisional Patent Application No. 61/367,584, filed Jul. 26, 2010, the disclosure of which is hereby incorporated herein by reference in its entirety.

BACKGROUND OF THE INVENTION

The present invention relates to controller circuits including a switch mode power regulator and applications of the same.

Devices such as circuit breakers, autoreclosers, anti thief devices, energy (electrical) meters and electrical energy distribution components are sometimes used in connection with the delivery and use of AC electrical power.

Many of these devices, including photo controllers, may make use of power converters to convert relatively high voltage alternating current to relatively low voltage direct current as is used in many conventional electronic devices. Some conventional power converters make use of large, high-voltage resistors to drop the voltage. However, these resistors are typically inefficient and generate high heat. The heat generated from the resistors may require that the resistors be housed in a large package and include heat dissipating elements, such as heat sinks. Also, the high heat generated by the resistors can lead to problems with reliability and longevity in the resistors and in other electronic components situated near the resistors.

Another conventional approach to power conversion is the use of a switch mode power converter (regulator). The switch mode power converters typically require six transistors or a micro-controller to implement. The requirement for multiple transistors or a micro-controller may cause the implementation of switch mode power converters to be cost prohibitive in some applications, such as in photo controllers or current limiters.

A small, low cost, efficient switch mode power converter (regulator) is described in U.S. Pat. No. 6,903,942 ("the '942 patent"), which is hereby incorporated herein by reference as if set forth in its entirety. The switch mode power converter of the '942 patent is illustrated in FIG. 1. The circuit shown in FIG. 1 is a switch mode power regulator, which implements power line synchronized pulse width modulation (firing angle modulation). The circuit comprises a power circuit and a control circuit. The power circuit comprises an output stage, which comprises a transistor Q3. The transistor's collector circuit comprises a relay K1 and a diode D6, known as a snubber diode, in parallel with the relay K1.

The circuit further comprises a first capacitor C6 coupled to the base of the transistor Q3, a first resistor R4 coupled in series to the first capacitor C6, and a second resistor R8 coupled in series to the first resistor R4. The circuit shown further comprises a first diode D7 coupled in parallel with the second resistor R8. The circuit further comprises a third resistor R5 coupled to the base of the first transistor Q3 and a Zener diode D1, whose cathode is connected to the first capacitor C6 and a second diode D5, and whose anode is connected to the third resistor R5.

The circuit also comprises a fourth resistor R6 coupled in series with the third diode D5, a relay K1 coupled in series with the fourth resistor R6, a third diode D6 coupled in parallel with the relay K1, a second capacitor C5 coupled to the fourth resistor R6, a fifth resistor R7 coupled in series with the second capacitor C5; and a plug, comprising a load, a neutral, and a line, wherein the load is coupled to the relay K1, the neutral is coupled to the emitter of the transistor Q3, and the line is coupled to the variable resistor, MOV1.

Transistor Q3 regulates the average voltage across the relay coil K1 by means of pulse width modulation. In the embodiment shown, transistor Q3 comprises a bipolar transistor, however, transistor Q3 may instead be a field-effect transistor (FET), or an insulated gate bipolar transistor (IGBT), provided a diode is placed cathode to drain and anode to source.

Transistor Q3 starts conducting at the start of the power line cycle (0 degrees) and continues conducting until enough current has flowed to maintain the relay voltage at the desired level. When transistor Q3 turns off, a voltage will be induced across the relay coil K1 by magnetic induction. This voltage is partially suppressed by diode D6 in order to prevent the failure of transistor Q3 due to over voltage.

The circuit shown in FIG. 1 utilizes half-wave rectification. Half-wave rectification is less expensive that full-wave rectification and requires less components. Since the relay K1 is highly inductive, it does not require a particularly clean DC signal. For example, the DC signal may include a large amount of ripple, which will not affect the operation of relay K1. Half wave rectification allows the circuit to operate in two modes, positive and negative. During the positive half, the transistor Q3 generates a current pulse, which is regulated by the average voltage across the relay K1. This process is pulse width modulation.

The control circuit shown in FIG. 1 comprises a pulse generator whose pulse width varies proportionately with the difference between the Zener voltage of diode D1 and the average voltage across the relay K1. At the start of the power line cycle (0 degrees), a current will begin to flow through diode D7, resistor R4, capacitor C6, and the base of transistor Q3. The current will cause transistor Q3 to turn on, starting a pulse.

Diode D7 and Resistor R8 provide half-wave power rectification. Resistor R8 is applied across the power rectifier D7, applying a negative current during the negative half of the line cycle. Resistor R8 allows a small negative current to be applied. Resistor R8 provides the negative current that switches on transistor Q3 during the negative half of the line cycle. That negative charge conducted through R8 must exceed the charge that conducts through capacitor C6 to assure transistor Q3 will turn on. Negative current switches on rectifier D6 and turns on transistor Q3, providing a current path between the low voltage side of capacitor C5 through resistor R7.

In the embodiment shown, without resistor R7, transistor Q3 would not saturate during the current pulse, causing excessive power to be dissipated in transistor Q3. The transistor Q3 collector voltage would drop until diode D5 would conduct, diverting base current from transistor Q3 and preventing transistor Q3 from saturating. During the transistor Q3 current pulse, a voltage is generated across resistor R7 that will keep diode D5 from conducting and preventing transistor Q3 saturation. To prevent diode D5 from conducting during the positive half of the line cycle, a voltage of at least the capacitor C6 ripple voltage must drop across resistor R7. Transistor Q3 does not start conducting until the instantaneous line voltage is approximately twice the Zener voltage of diode D1.

Capacitor C5 filters the voltage across the relay K1. If the value of C5 is too small, the relay coil current will oscillate on and off during power up causing the relay contacts to chatter.

Therefore, capacitor C5 shown is large enough a value to prevent this chattering of the relay contacts.

Capacitor C6 is pre-set to the output voltage and provides a timing functionality. During the positive half of the line cycle, a current flows through resistor R4 to capacitor C6, causing it to start charging, and through the base of transistor Q3, which will turn transistor Q3 on. Transistor Q3 remains on as long a current flows through capacitor C6. Increasing the value of capacitor C6 has the positive effect of increasing the gain of the feed back loop of the regulator circuit. However, increasing the value also slows the time it takes for the current pulse of transistor Q3 to be turned off, increasing commutation losses in transistor Q3, and increases the time for the regulator circuit to stabilize at startup.

As this current flows, the voltage across capacitor C6 increases. When the voltage across capacitor C6 plus the base to emitter voltage of transistor Q3 reaches the Zener voltage of diode D1, the current flowing through capacitor C6 ceases because the current is diverted to the Zener diode D1. Zener diode D1 provides the reference voltage to which the relay coil voltage will be regulated. When the current through capacitor C6 ceases, no current flows to the base of transistor Q3, turning it off and ending the pulse.

During the negative half of the line cycle, a current flows through resistor R8, diode D6, the collector and base of transistor Q3, and resistor R5. This current will turn transistor Q3 on. Also, during the negative half of the power line cycle, resistor R5 provides part of the current path through which capacitor C6 discharges into C5.

During the positive half of the line cycle at the end of the current pulse, resistor R5 causes transistor Q3 to more rapidly turn off, reducing energy losses during the commutation of transistor Q3. Resistor R5 will shunt some of the current that would otherwise go through the base of transistor Q3 during the pulse of transistor Q3 base current. If the current shunted is too much, the base current of transistor Q3 will not be enough to turn transistor Q3 completely on.

Capacitor C6 will now discharge into capacitor C5 until their voltages equalize. The voltage across capacitor C5 is equal to the average voltage across the relay coil K1. Diode D7 disconnects during the negative half of the power line cycle assuring that the relay current is direct current. As such, the discharge of capacitor C6 into capacitor C5 determines the pulse width for operation of the transistor Q3, which in turn allows current flow to establish the average mean voltage of relay coil K1.

The circuit shown in FIG. 1 also comprises a voltage averaging circuit, further comprising resistor R6, capacitor C5, and resistor R7. The averaging circuit essentially measures the average voltage across the relay coil K1. The average voltage across capacitor C5 is the voltage to which the circuit is regulated. The purpose of resistor R7, apart from forming part of the averaging circuit is also to ensure that diode D5 will not conduct during the positive half of the power line cycle. The current to resistor R8 flows through diode D6, turning it on, and then the current flows through the collector of transistor Q3, causing it to turn on. When transistor Q3 turns on, it creates a base current between the emitter of transistor Q3 and the negative end of capacitor C5. When the current begins flowing, diode D5 starts conducting, which causes capacitor C6 to discharge until at the same voltage as capacitor C5. The capacitors reach equal voltage at the average output voltage.

This feedback of the output voltage into the pulse forming circuit determines how long each cycle transistor Q3 will be turned on. (The feed back loop is as follows. Average voltage of relay coil K1 voltage→voltage of capacitor C5→voltage of capacitor C6→duty cycle of transistor Q3 commutation→average voltage of relay coil K1 voltage.) If the average voltage across the relay coil K1 is too low, the voltage across capacitor C6 will be less than the Zener voltage of diode D1 resulting in a longer on time of transistor Q3, which will cause the average relay coil voltage to increase. If the average voltage across the relay coil K1 is too high the voltage across capacitor C6 will approximate the Zener voltage of diode D1, resulting in a shorter on time of transistor Q3, which will cause the average relay coil voltage to decrease.

The circuit shown in FIG. 1 also comprises a plug J1, J2, J3. Plug J1, J2, J3 may be a twist lock Hubble type connector, used to connect a line voltage, neutral voltage, and load. The circuit also comprises a metal oxide variable resistor MOV1. MOV1 is not necessary for the operation of the circuit. It provides a level of protection, eliminating high voltage transients like might come from a lightning strike.

The '942 patent further describes the use of the above described power regulator to provide a photo controller for street lighting and the like. Likewise, U.S. patent application Ser. No. 12/700,251 ("the '251 application), which is hereby incorporated by reference herein as if set forth in its entirety herein, describes photocontrol circuits that may use power regulators. These circuits generally use a Zener diode to provide a DC voltage, typically 15 volts, to power the photo control circuits, such as diode D1 seen in FIG. 1 (or diode D3 in FIG. 2). However, the resultant DC voltage may have its quality limited by an AC component from the half wave rectifier and may also be subjected to fluctuation due to variations in the voltage level of the AC power signal used to generate the DC power signal.

An autorecloser circuit breaker is available from Sustainable Control Systems Limited ("SCS") that may be used, for example, as an alternative to metered delivery of power to a customer. An autorecloser is a circuit breaker equipped with a mechanism that can automatically close the breaker after it has been opened due to a fault. The SCS device uses a TRIAC as a relay. Such devices generally require the use of some form of heat sink to dissipate heat generated by the circuit without overheating and damaging the circuit.

SUMMARY OF THE INVENTION

Some embodiments of the present invention provide an autorecloser circuit including a relay circuit. The relay circuit includes an electromagnetic relay configured to be coupled between an AC power source and a customer location to deliver current from the AC power source to the customer location. A controller coupled to the relay circuit is configured to control the electromagnetic relay to disconnect the AC power source from the customer location and to reconnect the AC power source to the customer location. A current sense circuit coupled to the controller is configured to detect an amount of the current that is delivered to the customer location and a reference voltage circuit coupled to the controller is configured to establish a reference level for the amount of the current that is delivered to the customer location. A power circuit coupled to the controller and to the relay circuit is configured to provide a DC power source to the controller and to the relay circuit from the AC power source. The controller is configured to disconnect the AC power source from the customer location when the detected amount of current exceeds the reference level and to reconnect the AC power source to the customer location responsive to detection of a reconnect condition.

In other embodiments, an autorecloser circuit includes a relay circuit that includes an electromagnetic relay configured to be coupled between an AC power source and a customer location to deliver current from the AC power source to the customer location. A controller coupled to the relay circuit is configured to control the electromagnetic relay to disconnect the AC power source from the customer location and to reconnect the AC power source to the customer location. A current sense circuit coupled to the controller includes a current shunt resistor and an anti-aliasing filter circuit. The current shunt resistor is configured to detect an amount of the current that is delivered to the customer location. A reference voltage circuit coupled to the controller is configured to establish a reference level for the amount of the current that is delivered to the customer location. The reference voltage circuit includes a variable resistor configured to adjust the reference level and the controller includes a comparator having a first input coupled to the current sense circuit and a second input coupled to the reference voltage circuit. A power circuit coupled to the controller and to the relay circuit is configured to provide a DC power source to the controller and to the relay circuit from the AC power source. The power circuit includes a half-wave rectifier coupled to the AC power source and the power circuit is configured to provide from the half-wave rectifier a first voltage level as the DC power source to the relay circuit and a second voltage level, lower than the first voltage level, as the DC power source to the controller. The controller is configured to disconnect the AC power source from the customer location when the detected amount of current exceeds the reference level and to reconnect the AC power source to the customer location responsive to detection of a reconnect condition.

DETAILED DESCRIPTION OF EMBODIMENTS OF THE INVENTION

Figure 1:
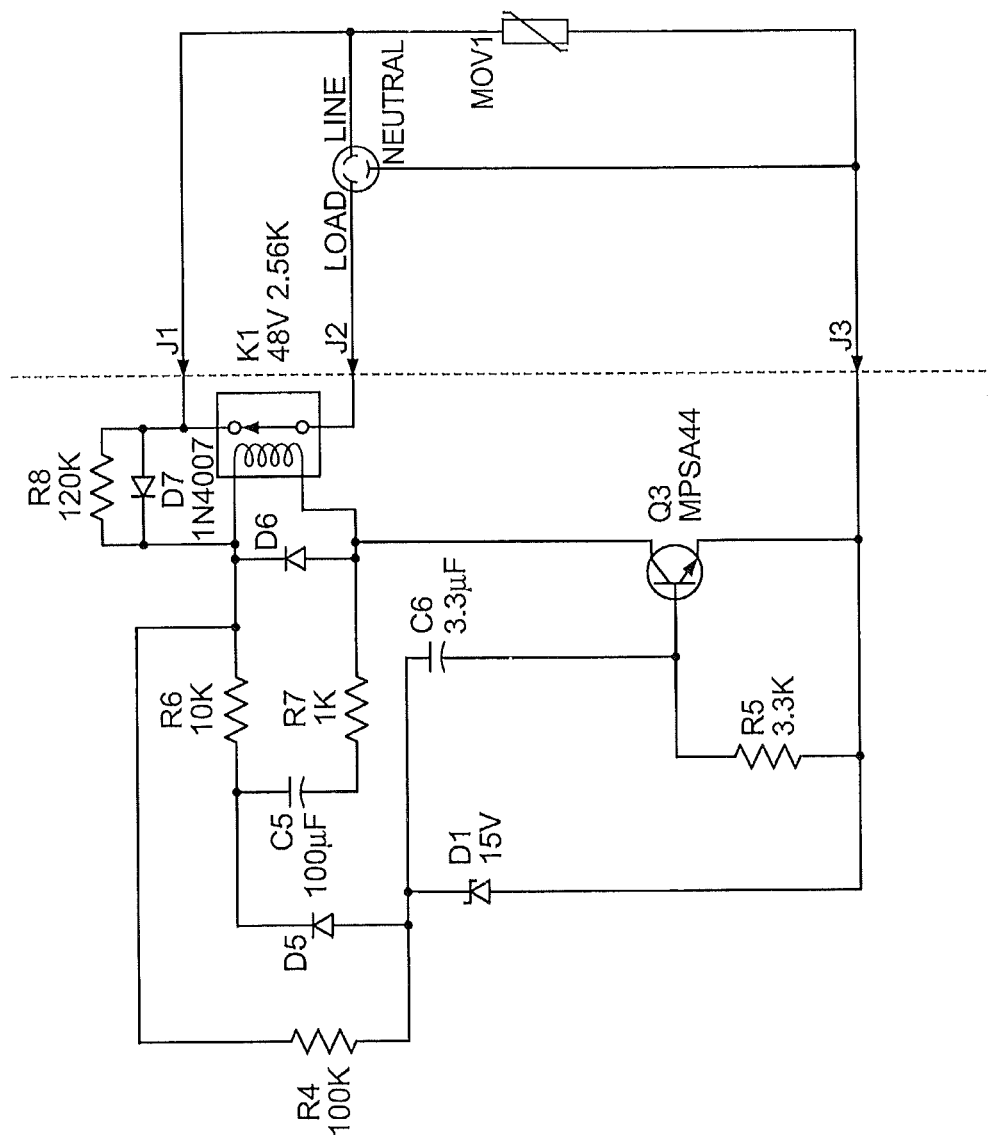
FIG. 1 is a circuit diagram of a power regulator according to the prior art.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Figure 2:
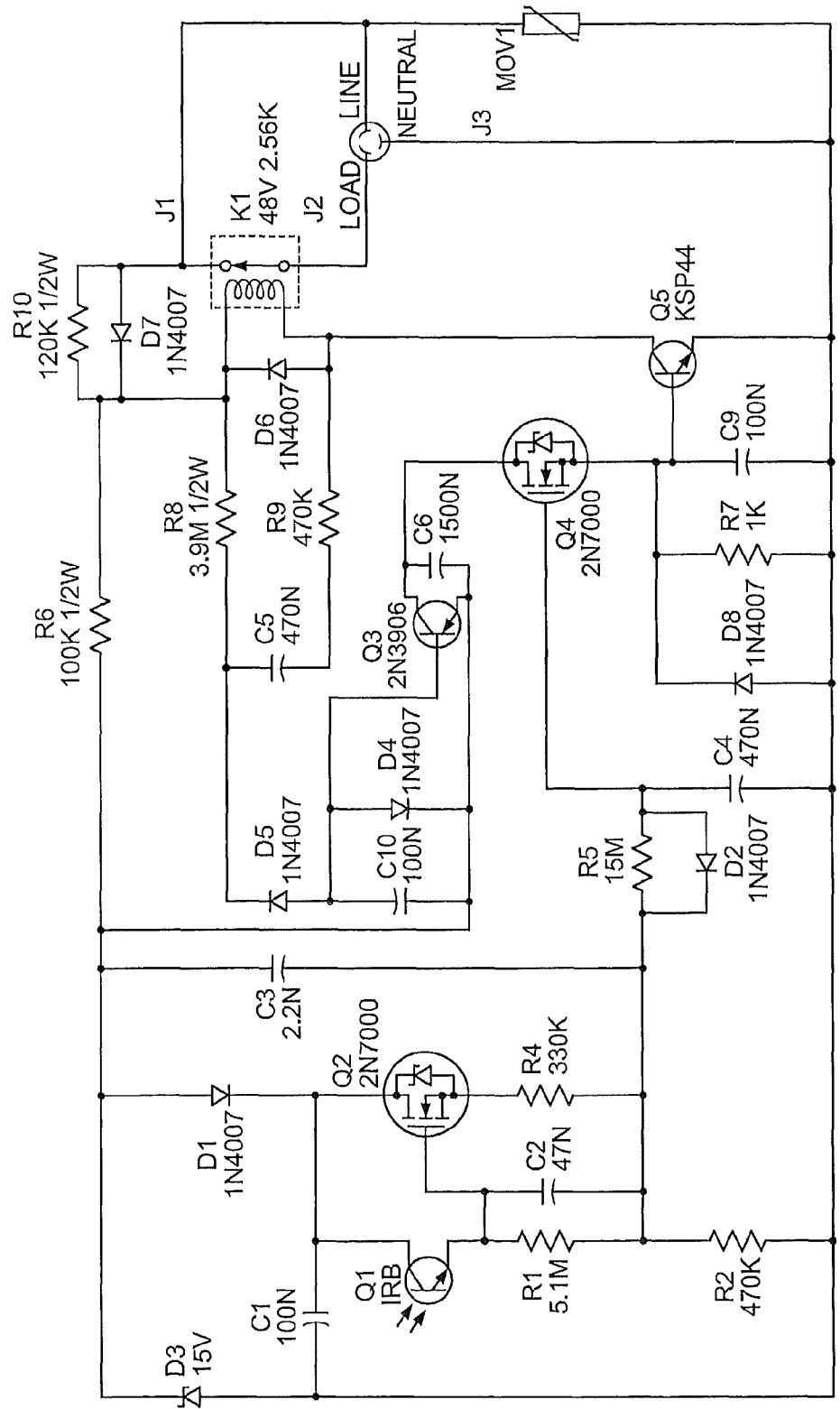
FIG. 2 is a circuit diagram of a photosensor described in the '251 application.

FIG. 2 illustrates a photo control circuit with a switch mode power converter. FIG. 2 corresponds to FIG. 7 of the '251 application. The circuit shown in FIG. 2 includes a current amplifier Q3 coupled between the voltage averaging circuit C5, R8, R9 and the select transistor Q4. The current amplifier Q3 amplifies a current discharged from the capacitor C5 of the voltage averaging circuit to a base of the drive transistor Q5 during the negative half of the AC power source to reduce an amount of current discharged from the capacitor C5 of the voltage circuit during the negative half of the AC power source.

The pulse width modulator circuit of FIG. 2 further includes a duty cycle capacitor C6 that discharges a current to the base of the drive transistor Q5 during the positive half of the AC power source. The current amplifier Q3 is coupled between the capacitor C5 of the voltage averaging circuit and the duty cycle capacitor C6. More particularly, the duty cycle capacitor C6 is coupled between a collector and an emitter of the current amplifier Q3.

The pulse width modulator circuit of FIG. 2 further includes a rectifying diode D5 coupled between the voltage averaging circuit and the current amplifier Q3. The rectifying diode D5 is coupled between a first terminal of the capacitor C5 of the voltage averaging circuit and a base of the current amplifier Q3. A second terminal of the capacitor C5 of the voltage averaging circuit is coupled to a collector of the drive transistor Q5 through the resistor R9.

The pulse width modulator circuit of FIG. 2 also includes a second diode D4 coupled between the base and the collector of the current amplifier Q3. Diode D4 is provided to protect current amplifier Q3 from being damaged by an emitter to base voltage breakdown caused by the reverse leakage of diode D5. The circuit of FIG. 2 further includes a capacitor C10 coupled between the base and the collector of the current amplifier Q3. Capacitor C10 is provided to limit or even prevent electrical noise, such as that caused by radio interference, from affecting the operation of the photosensor circuit.

Figure 3:
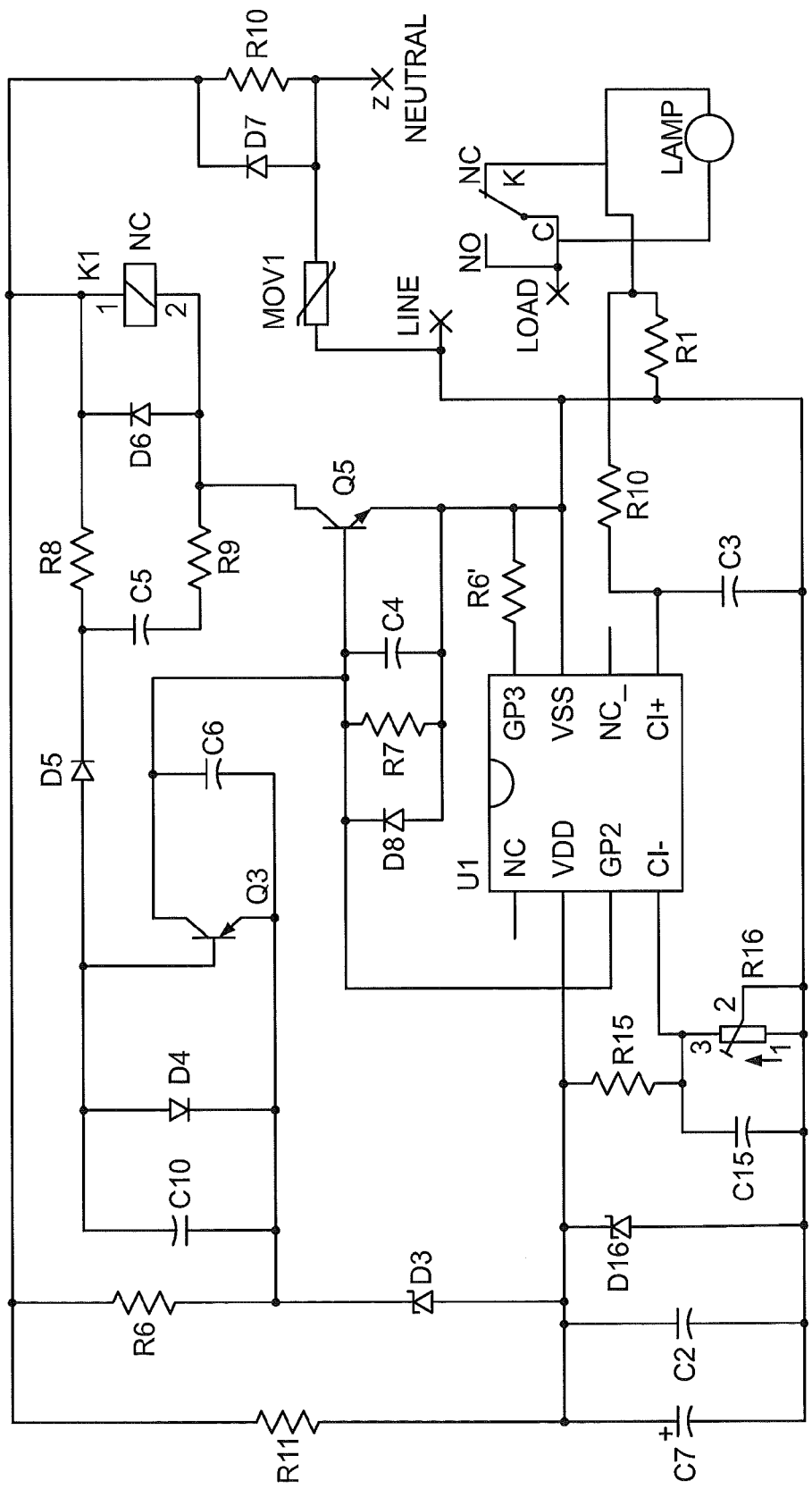
FIG. 3 is a circuit diagram of a controller circuit including a power regulator according to some embodiments of the present invention.
Figure 4:
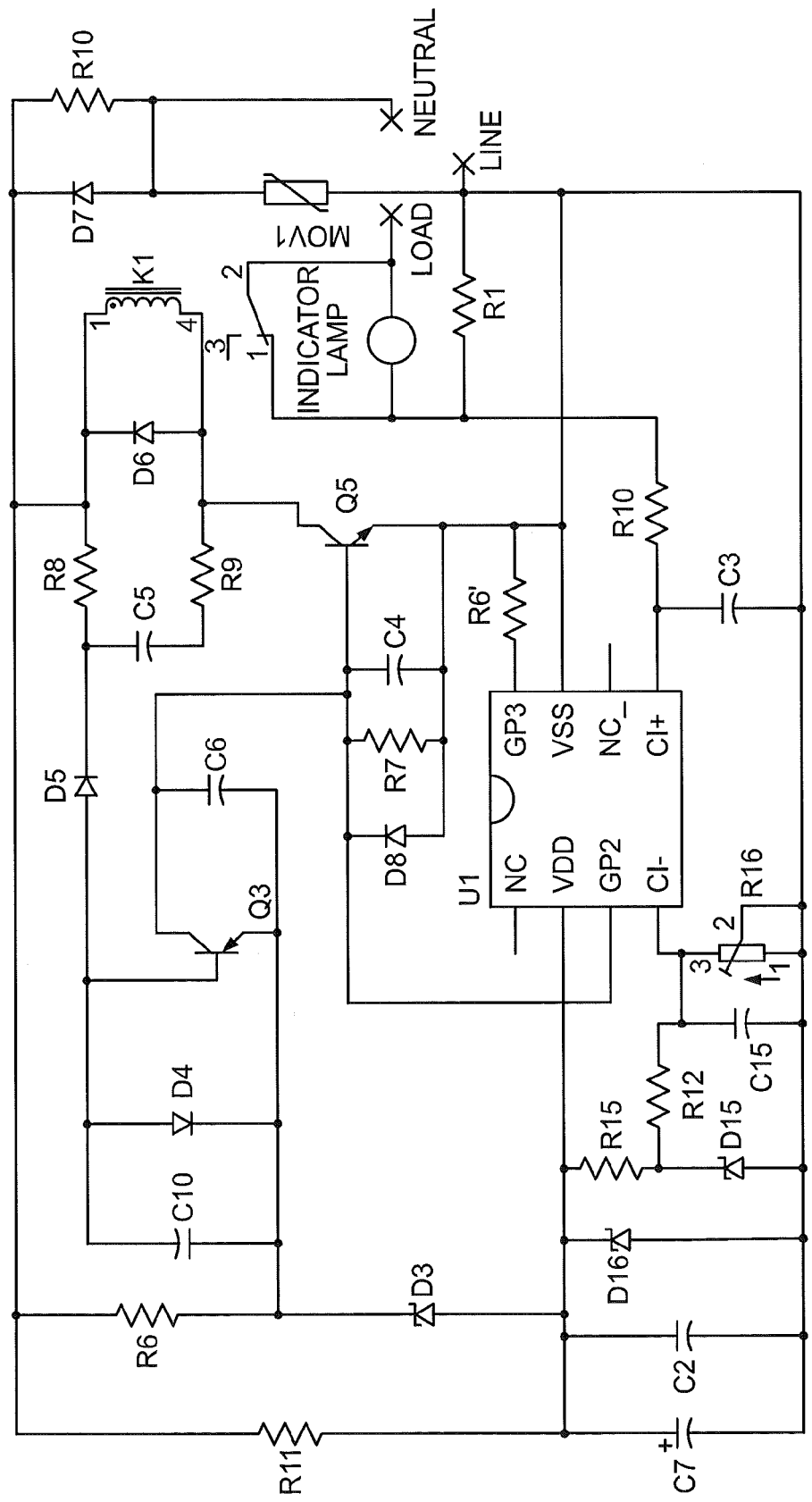
FIG. 4 is a circuit diagram of a controller circuit including a power regulator according to other embodiments of the present invention.

Embodiments of the present invention will now be described with reference to the circuit diagrams of FIGS. 3 and 4. For purposes of explaining the present invention, the controller circuit of FIGS. 3 and 4 illustrate an autorecloser breaker circuit that may be used, for example, to control AC power distribution to a customer. More particularly, the embodiments of FIGS. 3 and 4 utilize a relay circuit generally corresponding to that described with reference to FIG. 2, with the photocontrol circuit replaced with a current control circuit. Note that the circuit of FIG. 2 also differs in the coupling of the LINE and NEUTRAL signals (i.e., polarity).

Unlike the SCS autorecloser discussed above, the illustrated embodiments of autoreclosers use an electromagnetic relay, as described with reference to FIG. 2, instead of a TRIAC. As such, embodiments of the present invention may provide an autorecloser that is more energy efficient. As a result, the circuit may be applied without needing a heat sink and providing an energy cost savings. In addition, cooler operation and a smaller physical size may be provided as well as improved resistance to current surges with a circuit able to operate with higher operating currents. In addition, some embodiments of the present invention are hot pluggable. This may allow different accessories to be swapped in and out with the autorecloser, such as current limiters set at other current levels, shorting caps (to turn off current limiting), and open caps (to turn off power to the customer).

The illustrated embodiments of FIGS. 3 and 4 generally include: a relay and drive circuit, a power circuit, a micro controller, a current sensor (sense) circuit, a comparator circuit, a timer, a logic circuit and an indicator light. The comparator circuit, timer and logic circuit may be implemented in the micro controller. The circuit may also be coupled to a connector (LINE, LOAD, NEUTRAL) and placed in an electrically insulated protective housing (e.g., a weatherproof plastic cover and base connector that may be certified by safety agencies) as will be further described with reference to FIG. 5.

The embodiments of FIGS. 3 and 4 use a current shunt R1 for detection of customer energy usage (i.e., as a current sense circuit). The relay K1 may be opened when the detected energy usage exceeds a reference level. For the embodiments of FIGS. 3 and 4, the reference level is set by the reference voltage (and current limit) adjustment circuit, including resistors R15 and R16 and capacitor C15. The illustrated resistor R16 is a variable resistor, shown as a potentiometer, which may be used to calibrate or shift the reference level.

The micro controller U1 implements the comparator circuit by comparing the inputs on pins CI− and CI+. The pin GP2 may be shorted to VSS (negative polarity power supply input, coupled to LINE for the polarity seen in FIGS. 3 and 4) to turn current flow on to the relay K1 (i.e., breaking the circuit to the customer) or set to a high impedance (e.g., set as an input rather than an output pin) to turn off current flow to the relay K1 to allow normally closed operation (i.e., providing power to the customer by connecting the customer location to the AC power source). In other words, pin GP2 may be grounded, in which case the base current to transistor Q5 will stop by shorting the base and emitter of Q5 through micro controller U1, to stop current flow in the coil of the relay K1, allowing normally closed operation of the relay with AC power provided to the customer location. When GP2 is set to high impedance, current will flow to the base of transistor Q5 to allow regulated current flow through the coil of the relay K1, allowing opening of the relay K1 and cutting off AC power provided to the customer location. It will be understood that the logic would reverse in the case of a normally open relay. It will further be understood that the micro controller may be programmed to provide a reset timer and related logic, such as the delay time before reset, the number of resets allowed and the like depending upon the customer application needs.

In some embodiments the current sense circuit including the current shunt resistor R1 further includes an anti-aliasing filter circuit R10, C3 coupled to the current shunt R1 and the CI+ pin of the micro controller U1. In addition, in some embodiments, the pin GP3 of micro controller U1 is shown as coupled to the LINE reference (used as the ground reference bus in the illustrated embodiments) through a resistor R6'. Resistor R6' may be used to lower the power supply VDD current used by micro controller U1. An indicator lamp LAMP is also used in some embodiments, which may be used to provide a visual indication of the state of the relay. The lamp may be located remote from or local to the circuit, such as on the housing containing the circuit.

Note that the anode of diode D3 is connected to the pin VDD of micro controller U1 instead of the pin VSS of micro controller U1. The connection to VDD of the power supply provides that the current that flows through D3 may be used to power the micro controller U1 in addition to the alternative current path that will now be described.

Embodiments of controller circuits, such as those illustrated in FIGS. 3 and 4, are provided with a different power (supply) circuit than described with reference to FIGS. 1 and 2. It is this power circuit that differs between the embodiments of FIGS. 3 and 4 (note that the relay K1 is also illustrated in a different manner in FIGS. 3 and 4 but the electrical connections are the same in both figures). Referring first to FIG. 3, power/current may be coupled to the pin VDD of the micro controller U1 through diode D3 or through an alternative current path, shown as resistor R11. In addition, the diode D3, which was directly coupled to the ground reference in the circuit of FIG. 2, is coupled to the diode D16 in FIG. 3. The power supply circuit for the micro controller U1 in the embodiments of FIG. 3 further includes capacitors C7 and C2. Note that the two parallel capacitors C7, C2 may be replaced by a single capacitor. However, for embodiments using two capacitors, both an electrolytic and a ceramic capacitor may be used, rather than just an electrolytic capacitor, which may provide better filtering of high frequency noise for the power supply circuit.

By providing the alternative current path through resistor R11, the operation of the relay circuit D3, R6, C10, D4, D5, Q3, C6, C5, R8, R9, D6, K1, D7, R10 may be largely isolated from the current flow provided to power the micro controller U1 (e.g., the current flow to the base of transistor Q5 may be lower, allowing more rapid operation and lower current consumption).

While the power supply circuit of the embodiments of FIG. 3 provides a lower voltage, higher quality power supply for the micro controller U1, variations in AC line voltage level and the like may still result in a ten percent variation in the voltage level at the pin VDD. As such, the power supply in the embodiments of FIG. 4 may be used where an even more stable power input is desired. In addition to diodes D3, D16, resistors R6, R11 and capacitors C2, C7, the power supply circuit of the embodiments of FIG. 4 further includes diode D15. In addition, the resistor R15 of the reference voltage and current circuit of FIG. 3 is replaced by the combination of series resistors R15 and R12 in the embodiments of FIG. 4 to provide for coupling of the diode D15 therebetween. Note that, in yet further embodiments, diodes D16 and D15 may be coupled in series and the voltage input to pin VDD may be drawn from diode D15 (i.e., may be set to the Zener voltage level of diode D15, rather than the Zener voltage level of diode D16).

As described above, the embodiments of FIGS. 3 and 4 include a power circuit coupled to the controller U1 and to the relay circuit D3, R6, C10, D4, D5, Q3, C6, C5, R8, R9, D6, K1, D7, R10 that is configured to provide a DC power source to the controller U1 and to the relay circuit D3, R6, C10, D4, D5, Q3, C6, C5, R8, R9, D6, K1, D7, R10 from the AC power source. The controller U1 is configured to disconnect the AC power source from the customer location when the detected amount of current exceeds the reference level and to reconnect the AC power source to the customer location responsive to detection of a reconnect condition. The reconnect condition may be, for example, expiration of a selected delay time after the AC power source is disconnected from the customer location. In some embodiments, the reconnect condition is expiration of a selected delay time after the AC power source is diconnected from the customer location but only when a total number of resets since a reference time is less than or equal to a maximum number of allowed resets. In such embodiments, no reconnects may be allowed after the total number of resets is greater than the maximum number of allowed resets until some other reset event occurs to reset the total number of resets that are considered to have occurred.

In particular, the power circuit of FIGS. 3 and 4 includes a half-wave rectifier D7, R10 coupled to the AC power source (NEUTRAL in the illustrated embodiments). The power circuit is configured to provide from the half-wave rectifier D7, R10 a first voltage level as the DC power source to the relay circuit D3, R6, C10, D4, D5, Q3, C6, C5, R8, R9, D6, K1, D7, R10 and a second voltage level, lower than the first voltage level, as the DC power source to the controller U1.

The AC power source includes three lines (NEUTRAL, LINE, LOAD) and the half-wave rectifier D7, R10 is coupled to a first of the three lines. As discussed above, the power circuit includes a first diode D3 having a first end connected to the first of the three lines NEUTRAL and a second end connected to a second diode D16 of the power circuit and the second voltage level, lower than the first voltage level, is taken from the second end. The power circuit illustrated in FIG. 4 further includes a third diode D15 coupled in series with the first diode D3 and in parallel with the second diode D16 but in some embodiments the third diode D15 coupled in series with the first diode D3 and the second diode D16.

Figure 5:
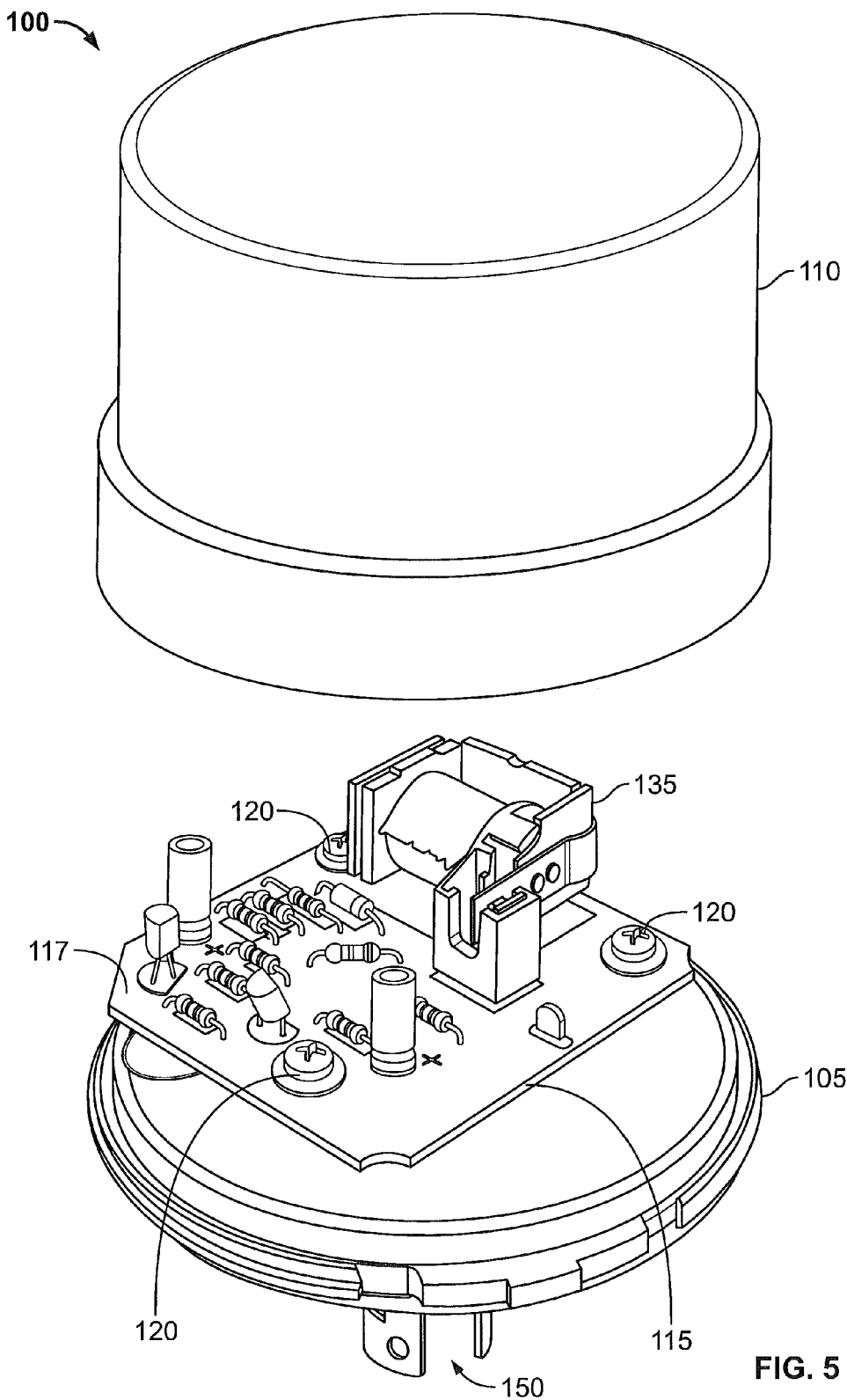
FIG. 5 is an exploded perspective view of an autorecloser circuit with a housing according to some embodiments of the present invention.

FIG. 5 is an exploded perspective view of an autorecloser circuit with a housing according to some embodiments of the present invention. As shown in the embodiments of FIG. 5, the autorecloser circuit 100 includes a base 105 and a mating cover 110 that together define a housing for a circuit board 115.

The circuit board 115, as illustrated in FIG. 5, is connected to the base 105 by mounting screws 120. The circuit board 115 also includes, on an upper surface 117 thereof, circuitry of the autorecloser circuit, such as illustrated in FIG. 3 or 4, generally illustrated by the various electrical components shown on the circuit board 115, including a switching device 135. The switching device 135 is illustrated as a relay in FIG. 1. The device circuitry of FIG. 1 is configured to control connection of an AC power source to a customer location by activating or deactivating the relay 135. The relay 135 may, in turn, be coupled through an electrical connector, such as the illustrated 3-pole locking-type connector 150 to the AC power source when inserted in an AC power receptacle so that power to the customer location may be turned on or off responsive to the state of the relay 135.

The autorecloser circuit 100 of FIG. 5 may be hot pluggable into the AC power receptacle without damaging the autorecloser circuit. The autorecloser circuit 100 may also be one component of a kit that further includes a shorting cap and/or an open cap having a 3-pole locking-type connector 150 like that shown in FIG. 5 that is configured to be inserted in the AC power receptacle.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. An autorecloser circuit, comprising:

a relay circuit including an electromagnetic relay configured to be coupled between an AC power source and a customer location to deliver current from the AC power source to the customer location;

a controller coupled to the relay circuit that is configured to control the electromagnetic relay to disconnect the AC power source from the customer location and to reconnect the AC power source to the customer location;

a current sense circuit coupled to the controller that is configured to detect an amount of the current that is delivered to the customer location;

a reference voltage circuit coupled to the controller that is configured to establish a reference level for the amount of the current that is delivered to the customer location;

a power circuit coupled to the controller and to the relay circuit that is configured to provide a DC power source to the controller and to the relay circuit from the AC power source, wherein the controller is configured to disconnect the AC power source from the customer location when the detected amount of current exceeds the reference level and to reconnect the AC power source to the customer location responsive to detection of a reconnect condition;

a circuit board having the relay circuit, the controller, the current sense circuit, the reference voltage circuit and the power circuit thereon; and a 3-pole locking-type connector coupled to the circuit board that is configured to couple the autorecloser circuit to the AC power source when inserted in an AC power receptacle.

2. The autorecloser circuit of claim 1, further comprising:
a housing including the circuit board therein and the connector thereon.

3. The autorecloser circuit of claim 1 wherein the autorecloser circuit is hot pluggable into the AC power receptacle without damaging the autorecloser circuit.

4. The autorecloser circuit of claim 1 in combination with at least one of a shorting cap and an open cap having a 3-pole locking-type connector that is configured to be inserted in the AC power receptacle.

5. The autorecloser circuit of claim 1, wherein the power circuit includes a half-wave rectifier coupled to the AC power source and wherein the power circuit is configured to provide from the half-wave rectifier a first voltage level as the DC power source to the relay circuit and a second voltage level, lower than the first voltage level, as the DC power source to the controller.

6. The autorecloser circuit of claim 5, wherein the AC power source includes three lines and the half-wave rectifier is coupled to a first of the three lines and wherein the power circuit includes a first diode having a first end connected to the first of the three lines and a second end connected to a second diode of the power circuit and wherein the second voltage level, lower than the first voltage level, is taken from the second end.

7. The autorecloser circuit of claim 6, wherein the power circuit further comprises a third diode coupled in series with the first diode and in parallel with the second diode.

8. The autorecloser circuit of claim 6, wherein the power circuit further comprises a third diode coupled in series with the first diode and the second diode.

9. The autorecloser circuit of claim 1, wherein the current sense circuit includes a current shunt resistor and an anti-aliasing filter circuit.

10. The autorecloser circuit of claim 1, wherein the reference voltage circuit includes a variable resistor configured to adjust the reference level.

11. The autorecloser circuit of claim 1, further comprising a lamp coupled to the relay circuit that is configured to provide a visual indication of a state of the electromagnetic relay.

12. The autorecloser circuit of claim 1, wherein the electromagnetic relay comprises a normally closed relay and wherein the relay circuit includes a drive transistor coupled in series with the electromagnetic relay and having a base coupled to the controller and wherein the controller is configured to short the base to stop current flow through the drive transistor to reconnect the AC power source to the customer location and to provide a high impedance connection between the base and the controller to allow the relay circuit to provide a regulated current flow through the electromagnetic relay to disconnect the AC power source from the customer location.

13. The autorecloser circuit of claim 12, wherein the AC power source includes a LINE, NEUTRAL and LOAD connection and wherein the power circuit includes a half-wave rectifier coupled to the NEUTRAL and wherein the electromagnetic relay and the drive transistor are coupled in series between the NEUTRAL and the LINE.

14. The autorecloser circuit of claim 13, wherein the power circuit is configured to provide from the half-wave rectifier a first voltage level as the DC power source to the relay circuit and a second voltage level, lower than the first voltage level, as the DC power source to the controller and wherein the power circuit includes a first diode having a first end connected to the NEUTRAL and a second end connected to a first end of a second diode of the power circuit having a second end connected to the LINE and wherein the second voltage level, lower than the first voltage level, is taken from the second end of the first diode.

15. The autorecloser circuit of claim 1, wherein the controller includes a comparator having a first input coupled to the current sense circuit and a second input coupled to the reference voltage circuit.

16. The autorecloser circuit of claim 1, wherein the reconnect condition comprises expiration of a selected delay time after the AC power source is disconnected from the customer location.

17. The autorecloser circuit of claim 16, wherein the reconnect condition comprises expiration of a selected delay time after the AC power source is disconnected from the customer location when a total number of resets since a reference time is less than or equal to a maximum number of allowed resets and wherein no reconnects are allowed after the total number of resets is greater than the maximum number of allowed resets.

18. An autorecloser circuit, comprising:
a relay circuit including an electromagnetic relay configured to be coupled between an AC power source and a customer location to deliver current from the AC power source to the customer location;

a controller coupled to the relay circuit that is configured to control the electromagnetic relay to disconnect the AC power source from the customer location and to reconnect the AC power source to the customer location;

a current sense circuit coupled to the controller that is configured to detect an amount of the current that is delivered to the customer location;

a reference voltage circuit coupled to the controller that is configured to establish a reference level for the amount of the current that is delivered to the customer location; and a power circuit coupled to the controller and to the relay circuit that is configured to provide a DC power source to the controller and to the relay circuit from the AC power source, wherein the controller is configured to disconnect the AC power source from the customer location when the detected amount of current exceeds the reference level and to reconnect the AC power source to the customer location responsive to detection of a reconnect condition, wherein the relay circuit includes a pulse width modulator circuit configured to generate a pulse width modulated signal having a pulse width that varies responsive to an average voltage across a relay coil of the electromagnetic relay, the pulse width modulator including a voltage averaging circuit including a capacitor coupled in parallel with the relay coil.

* * * * *